Nov. 23, 1937.   G. R. SAWYER   2,100,272
ELECTRIC REVERSIBLE TOOTH BRUSH
Filed Sept. 3, 1935
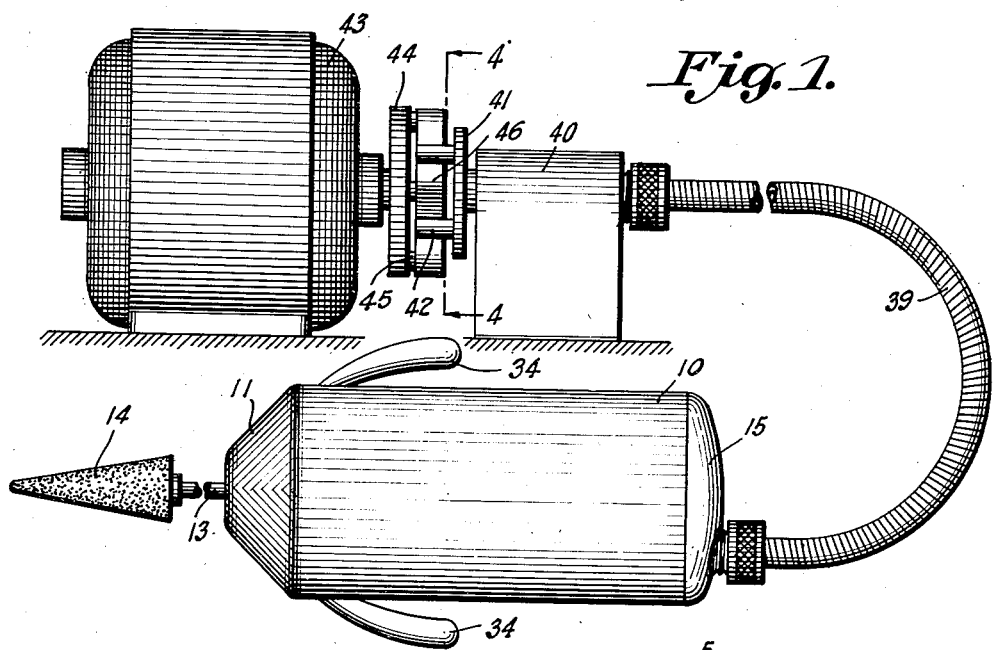
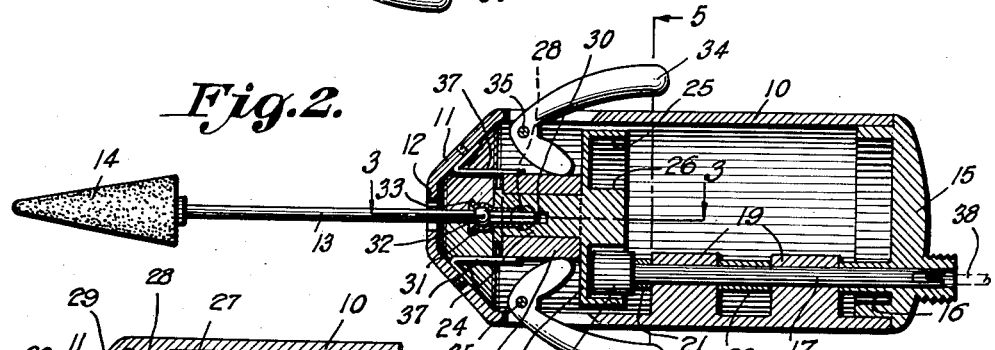
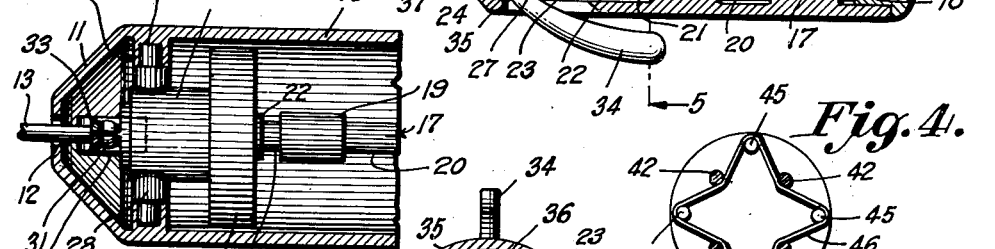
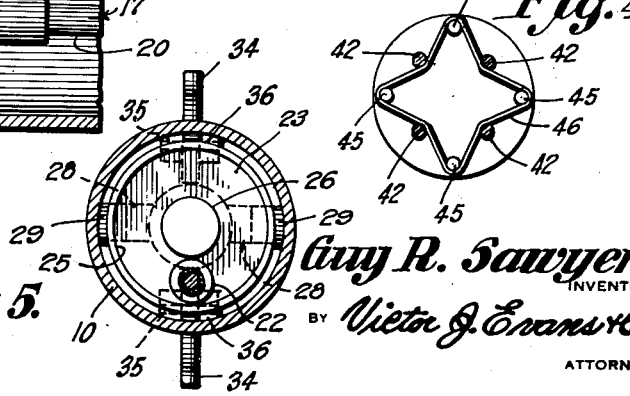
Guy R. Sawyer, INVENTOR
BY Victor J. Evans & Co.
ATTORNEY

UNITED STATES PATENT OFFICE 2,100,272

ELECTRIC REVERSIBLE TOOTH BRUSH

Guy R. Sawyer, Glover, Vt., assignor of one-half to B. R. Sherburne, Glover, Vt.

Application September 3, 1935, Serial No. 39,000

3 Claims. (Cl. 74—204)

This invention relates to rotary tooth brushes and has for an object to provide novel means for reversing the direction of rotation of the tooth brush so that the upper and lower teeth may be brushed from the gums towards the biting ends of the teeth.

A further object of the invention is to provide novel means to prevent any possibility of current being conveyed from the motor to the tooth brush casing.

A further object is to provide a device of this character which will be formed of a few strong, durable and inexpensive parts, which will be easy to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a side elevation of a motor driven tooth brush constructed in accordance with the invention.

Figure 2 is a longitudinal sectional view through the tooth brush casing.

Figure 3 is a fragmentary longitudinal sectional view taken on the line 3—3 of Figure 2.

Figure 4 is a cross sectional view taken on the line 4—4 of Figure 1, showing the coupling for connecting the flexible driving shaft to the motor.

Figure 5 is a cross sectional view taken on the line 5—5 of Figure 2, showing the opposed annular driving surfaces of the friction wheel.

Referring now to the drawing in which like characters of reference designate similar parts in the various views, 10 designates a casing which may be formed of any desired material and one end of the casing is reduced, as shown at 11, and provided with an axial aperture 12 to receive the shank 13 of a substantially conical tooth brush 14.

The opposite end of the casing is closed by a cap 15 which is provided with a bearing 16 for one end of a motor driven shaft 17, the casing being provided with a pair of spaced bearings 19 which rotatably receive the shaft. Spacing washers 20 and 21 are disposed on the shaft, as best shown in Figure 2. The shaft is equipped at the inner end with a friction pulley 22.

A friction wheel 23 is provided with an integral axial shaft 24 on one side and on the opposite side is provided with a circular groove of rectangular cross section which forms opposed concentric driving surfaces 25 and 26 in the wheel. The friction pulley 22 on the motor driven shaft is received in the groove and is selectively engaged with either one of the driving surfaces by tilting the friction wheel as will now be described.

A cylindrical bearing 27 is provided near the front end with gudgeons 28 which are rotatably received in bearings 29 and project radially from the inner wall of the casing 10 and permit of the bearings being rocked or tilted on an axis disposed at a right angle to the axis of the casing. The bearing 27 rotatably receives the shaft 24 of the friction wheel and mounts the friction wheel to be tilted or pivoted in the casing so as to selectively engage either the driving surface 25 or the driving surface 26 with the friction pulley 22 to reverse rotation of the brush.

The shaft 24 is provided in the outer end with a socket 30 to receive the shank 13 of the tooth brush and preferably both the shank and the socket are rectangular in cross section to prevent twisting of the shank in the socket. Springs 31 are disposed in the socket and yieldably hold the shank against accidental displacement from the socket. The shank is provided with a ball enlargement 32 which is received in a correspondingly shaped enlargement of the springs to limit insertion of the shank in the socket. The springs are provided with flared outer ends 33 which permit the shank to be easily guided into the socket when applying the tooth brush.

For manually tilting the friction wheel a pair of angular levers 34 are journaled at the elbows on pivot pins 35 carried by hinge ears 36 which project radially from the casing. Each lever is provided with a short inner leg which bears against the bearing 27 and is provided with a long outer leg which is exposed upon the exterior of the casing 10. Gentle pressure of the operator's fingers upon either of the levers will pivot the bearing 27 and move the friction wheel to engage one of the driving surfaces with the friction pulley, according to which lever is depressed. A pair of springs 37 are fixed to the reduced end 11 of the casing and bear upon opposite sides of the bearing 27 to normally hold the bearing and the friction wheel in neutral position so that the brush will not be rotated until one of the levers 34 is depressed, even though the motor driven shaft 17 is rotating.

The motor driven shaft 17 is connected to a flexible shaft 38 which is housed in a flexible casing 39. The end of the flexible shaft is journaled in a suitable bearing 40 and is equipped with a flange 41 which is provided with a plurality of pins 42. The shaft of the motor 43 is provided with a flange 44 which also is provided with a plurality of pins 45 that project into the spaces between the pins 42. A rubber band 46 is trained over the pins 45 and under the pins 42, as best shown in Figure 5, to couple the shaft of the motor to the flexible driving shaft and prevent any possibility of current being conveyed from the motor to the casing 10 of the tooth brush.

In operation the user may utilize the casing 10 as a handle with which to manipulate the brush 14 over the inner and the outer surfaces of the teeth. As will be understood it will be necessary to reverse the direction of rotation of the brush when the brush is transferred from the upper teeth to the lower teeth if it is desired always to brush the teeth from the gums to the biting ends. To reverse the direction of rotation of the brush the operator need merely tighten his grip or fingers upon that particular lever 34 which will tilt the friction wheel in the proper direction to engage that particular driving surface of the wheel with the friction pulley that will effect the desired direction of rotation of the tooth brush.

From the above description it is thought that the construction and operation of the invention will be fully understood without further explanation.

What is claimed is:

1. In a device of the class described, a casing forming a handle, angular levers pivoted on opposite sides of the handle and each having a long leg exposed exteriorly of the handle and a short leg entering the interior of the handle, a friction wheel mounted to tilt on an axis transverse to the longitudinal axis of the casing and adapted to be rocked by the levers in a selected direction, there being concentric annular surfaces on the friction wheel, a motor driven shaft entering the handle, and a friction pulley on the shaft between said driving surfaces and engageable selectively with said driving surfaces when said angular levers are selectively manipulated.

2. In a device of the class described, a casing forming a handle, a friction wheel within the casing having opposed annular concentrically disposed driving surfaces in one face, a shaft extending axially from the other face of the wheel, a bearing surrounding said shaft and having trunnions pivotally mounted in the casing, levers pivoted on the casing and entering the casing for rocking the bearing on its pivot to correspondingly rock the friction wheel, a motor driven shaft entering the casing, and a friction pulley on the latter shaft between said driving surfaces selectively engageable with said driving surfaces by manipulation of said levers to reverse direction of rotation of the friction wheel.

3. In a device of the class described, a casing forming a handle, a friction wheel within the casing having opposed annular concentrically disposed driving surfaces in one face, a shaft extending axially from the other face of the wheel, a bearing surrounding said shaft and having trunnions pivotally mounted in the casing, springs carried by the casing and engaging said bearing to normally hold said friction wheel in a predetermined neutral position, levers pivoted on the casing and engageable with said bearing to rock the bearing on its pivot and correspondingly rock the friction wheel against the tension of said spring, a motor driven shaft entering the casing, and a friction pulley on the latter shaft selectively engageable with said driving surfaces by manipulation of said levers to reverse direction of the friction wheel.

GUY R. SAWYER.